United States Patent [19]

Longinotti

[11] 4,274,779

[45] Jun. 23, 1981

[54] HANDLING PLANT FOR CEMENT TILES OR THE LIKE WITH THE AID OF TRAYS UPON WHICH THE TILES ARE PLACED FOR SEASONING

[76] Inventor: Enrico Longinotti, Via T. Bertelli 2, Florence, Italy

[21] Appl. No.: 23,783

[22] Filed: Mar. 26, 1979

[30] Foreign Application Priority Data

Mar. 30, 1978 [IT] Italy .................................. 9398 A/78

[51] Int. Cl.³ ............................................ B65G 60/00
[52] U.S. Cl. ........................................ 414/32; 414/43; 414/225; 414/416; 414/627; 198/339; 198/472
[58] Field of Search ............... 414/225, 416, 564, 591, 414/627, 32, 41–43, 69, 96, 127, 223; 198/339, 472

[56] References Cited

U.S. PATENT DOCUMENTS

| 3,527,087 | 3/1968 | Converse et al. ................ 198/472 X |
| 4,180,361 | 12/1979 | Longinotti ....................... 414/564 X |

Primary Examiner—Leslie J. Paperner
Assistant Examiner—Terrance L. Siemens
Attorney, Agent, or Firm—McGlew and Tuttle

[57] ABSTRACT

A plant for handling cement tiles and similar articles is disclosed which includes a charging station, a roller conveyor for serially moving trays through a first conveying path toward the charging station, two or more switches along the first conveying path within the charging station operable to cyclically stop movement of the trays in steps equal to one of the tray length and a multiple thereof so that the tray sequentially receives two or more stackings of the articles from the charging station.

8 Claims, 14 Drawing Figures

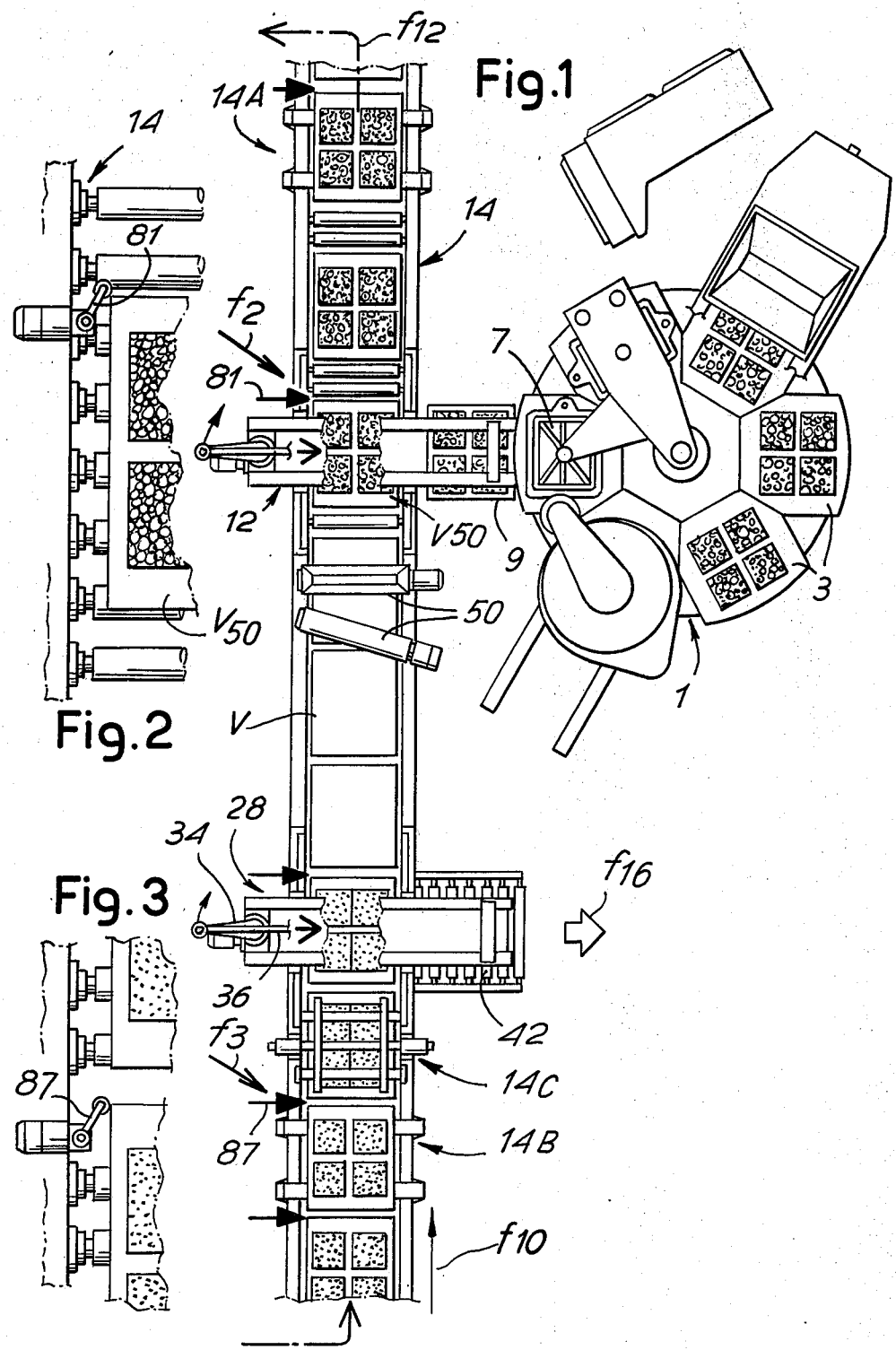

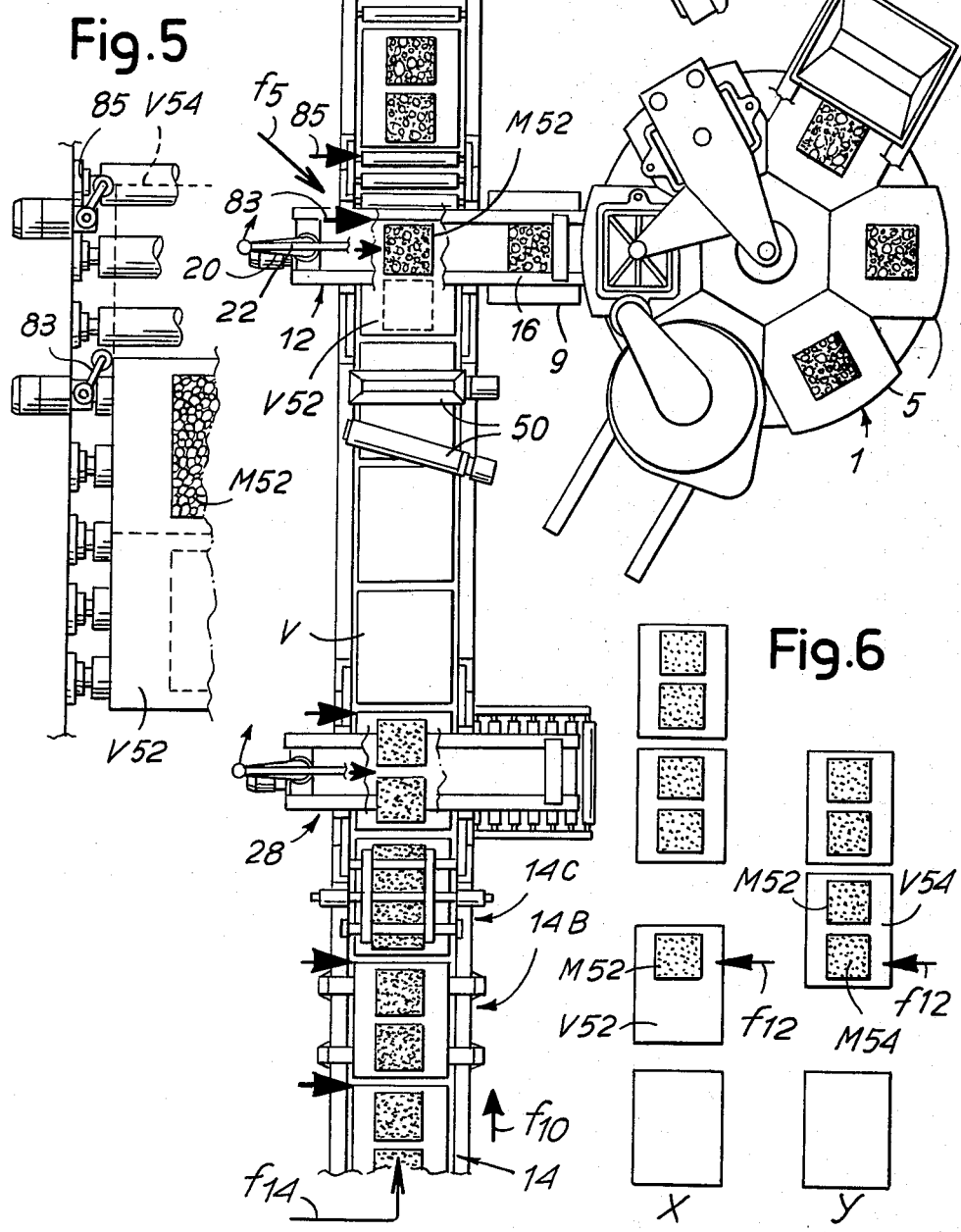

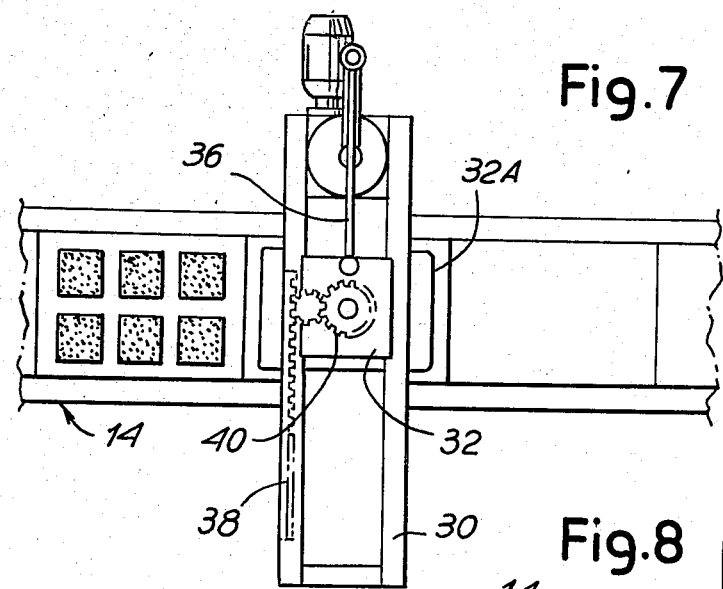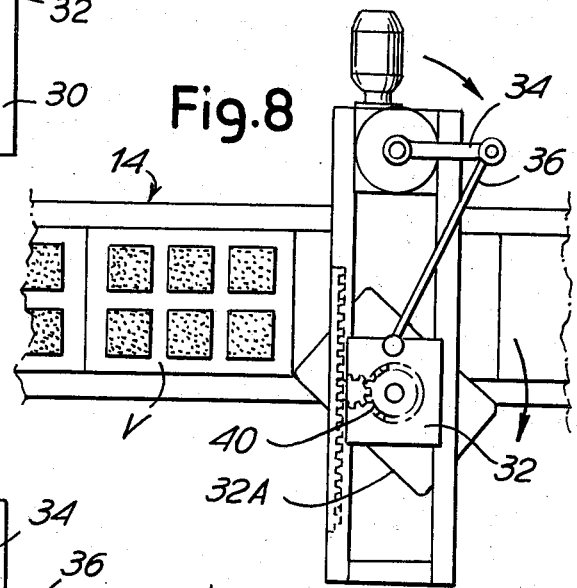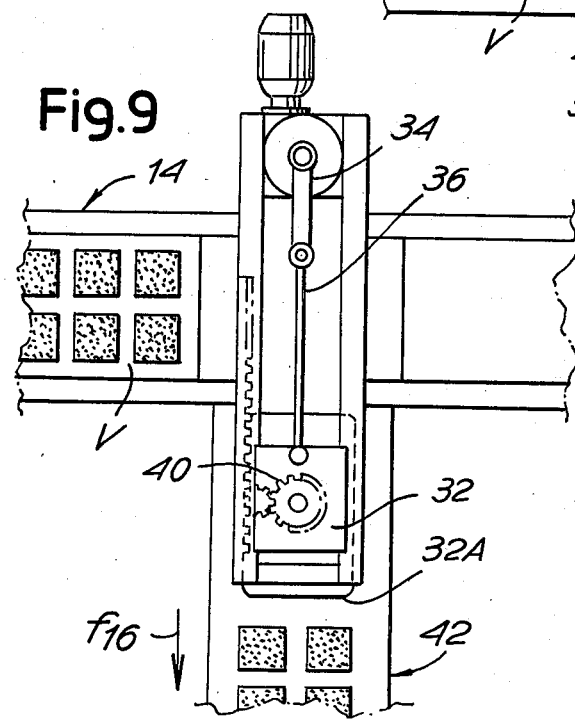

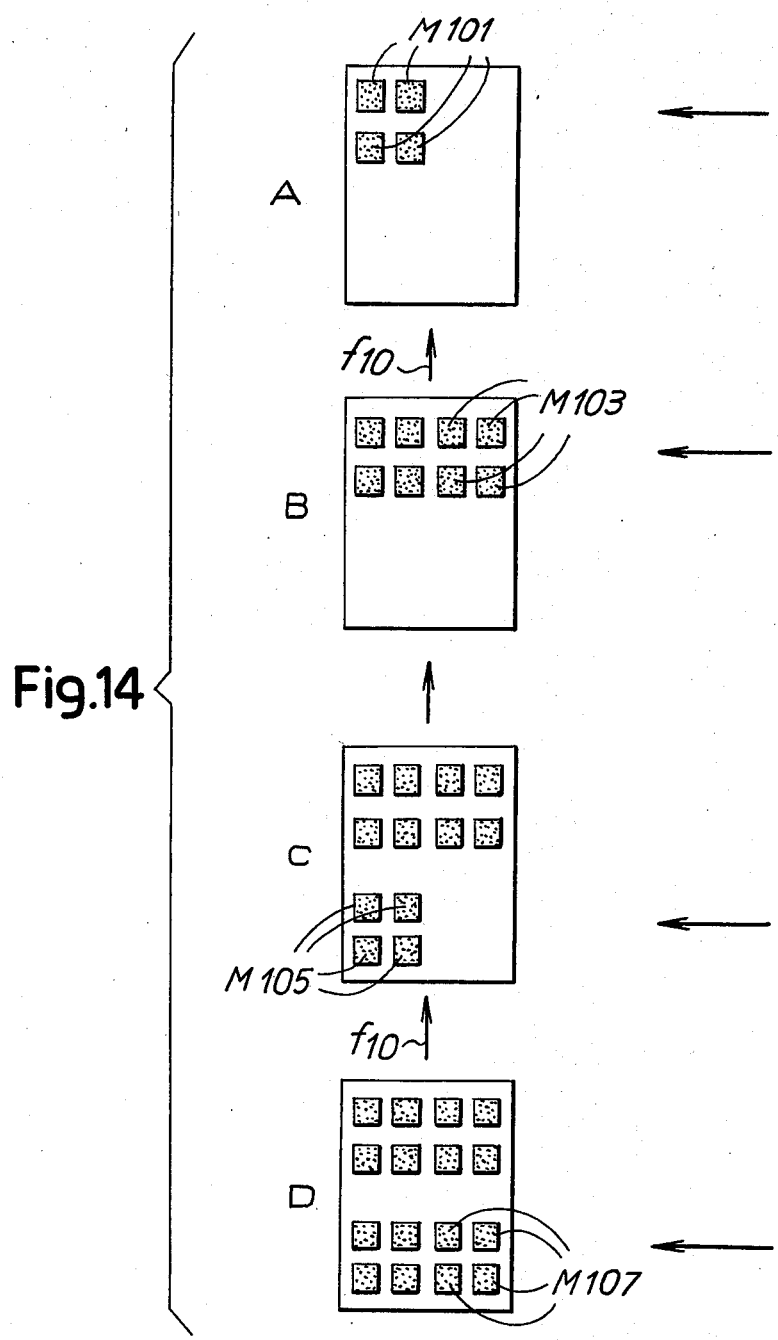

HANDLING PLANT FOR CEMENT TILES OR THE LIKE WITH THE AID OF TRAYS UPON WHICH THE TILES ARE PLACED FOR SEASONING

FIELD AND BACKGROUND OF THE INVENTION

The invention relates to an improvement in plants for handling tiles or the like molded by a continuous cycle with single or multiple molds, using trays upon which said molded tiles are placed and from which the molded and, if necessary, seasoned tiles can be picked up for a subsequent working process, said trays advancing intermittently along sliding tracks.

SUMMARY OF THE INVENTION

The purpose of this improvement is to use the trays more rationally by reducing their number with the same output, or by reducing their overall dimensions in the cells or seasoning stoves, and in storing and transporting them.

According to the invention, the trays are selectively moved forward, both through steps equal to the trays length and through steps equal to submultiples of the tray length; in the latter case each tray receives tiles from a single casting or from two or more subsequent castings to form one or more piles of tiles, then the tile row is advanced a step for allowing the same tray to receive, in a different position, one or more tiles from a single or more subsequent castings.

In an embodiment of the invention, two or more stops are provided along the tray track in correspondence of the stripping and laying station of the tiles (or the like) consisting of two microswitches or the like, spaced of a corresponding submultiple (half, third etc.) of the tray length measured in the feed direction. Means are also provided to cyclically operate different stops for stopping the feed of the trays after tray-length steps or steps equal to a submultiple of said length.

According to a further feature of the invention, before a longitudinal tray feed is started, said tray receives in correspondence of each stop position along its feeding track, at least two groups of tiles or the piles set up side by side. Transversally arranged groups can be obtained by differential translations of the equipment transferring the tiles from the press to the tray.

The apparatus may include an equipment having a plate with a plurality of suckers for picking up the tiles of a tray to be subsequently worked. The sucker plate can be rotated, after the picking of the tiles, ninety degrees with respect to the equipment in order to allow the tiles to have a limited work front upon a track which is orthogonal to the tray track; the plate can be rotated, in a per se known way, when the equipment is orthogonally shifted relative to the feed direction of the trays.

The invention will be better understood with reference to the specification and accompanying drawings showing a non-limitative embodiment of the invention itself.

BRIEF DESCRIPTION OF THE DRAWINGS

FIG. 1 shows a plan view of a plant with stripping from each mold of a press upon a single tray;

FIGS. 2 and 3 being enlarged details of parts of FIG. 1 indicated by arrows f2 and f3;

FIG. 4, like FIG. 1, shows a plant with stripping from two subsequent molds upon the same tray;

FIG. 5 shows an enlarged detail of the part indicated by f5 in FIG. 4;

FIG. 6 is a diagram illustrating two subsequent strippings performed in two phases X and Y by two subsequent molds upon the same tray;

FIGS. 7, 8 and 9 are plan views of transferring phases of a plurality of tiles—laid down during three subsequent phases upon the same tray from three molds and from said tray to a transversal transfer by means of the rotation of all the tiles simultaneously picked up from the tray;

FIG. 14 shows a set of tiles being laid down in four subsequent groups with transversal and longitudinal arrangement.

DETAILED DESCRIPTION

Figure 12:
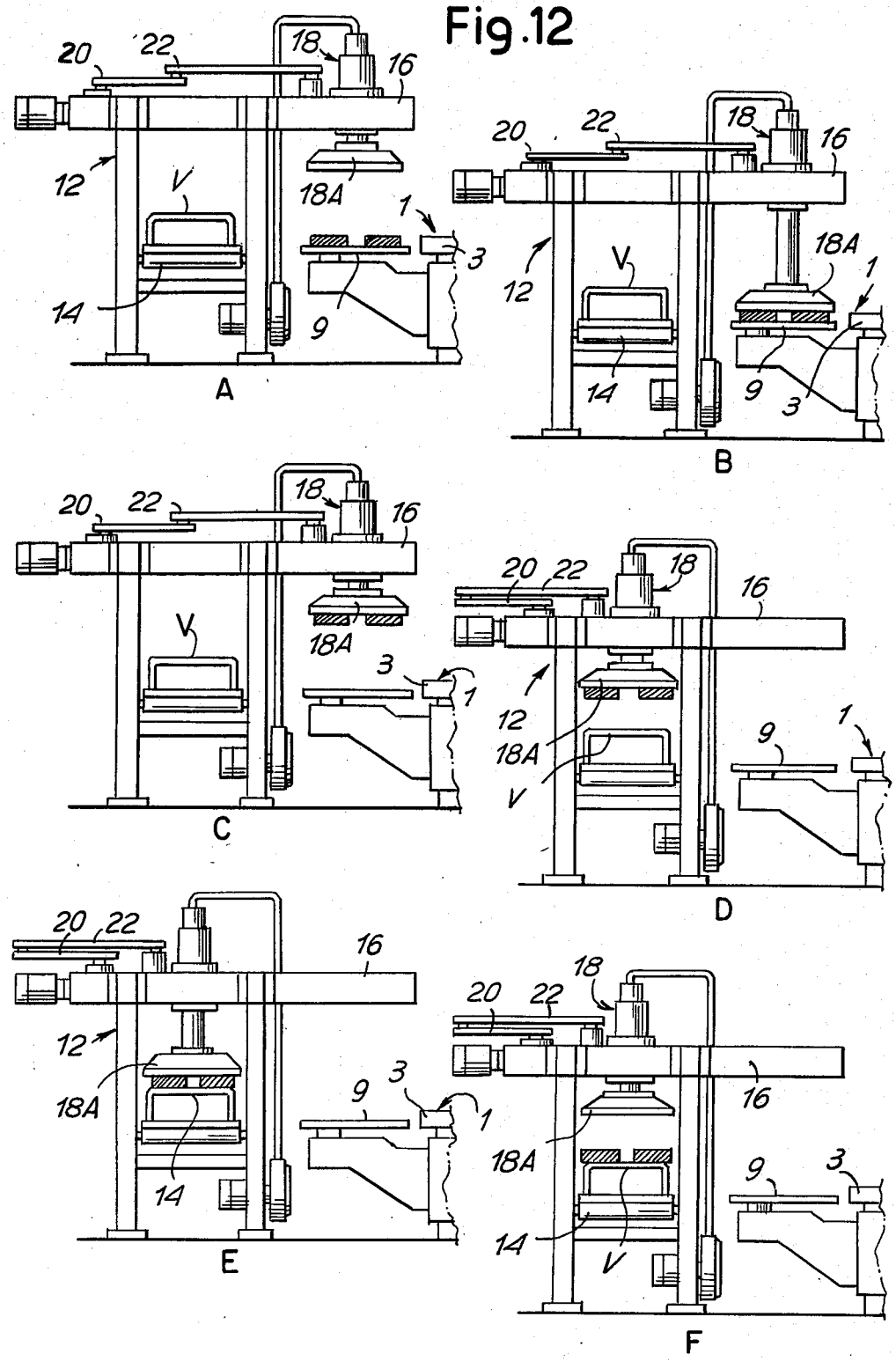
FIGS. 12 and 13 show subsequent phases of a cycle for the transfer of tiles from the press to a tray and from a tray to a leading track to be worked further.

According to what is shown in the accompanying drawing, a plant includes a circular press 1 having a plurality of replaceable molds like those denoted by 3 in FIGS. 1 and 5 in FIG. 4. The molds are arranged, time after time, to make single or multiple tiles of different sizes. The press type is well known and conventionally used in the art. The press 3 is provided with a stripping position at which an appropriate/ejector 7 is located for remaining the molds mounted on the press. By well known means, the stripped tiles are transferred with radial displacement to the surface of a platform or blade 9 from which the files can subsequently be picked up. Reference numeral 12 denotes a pick up system to lead the tiles to a transfer with trays, said transfer can be a roller conveyor 14, upon which trays V can shift. The trays may, if desired be stacked one upon the other. The trays are moved forward path according to arrow f10 by means of a controlled roller rotation for single track lengths; the stop of a track length rollers is obtained through switches (which will be described later) actuated by the trays, and the start is obtained through other switches of limit work, actuated by other devices. The feed control of the trays is effected as specified in the following description, according to the following criteria. The pick up system 12, as shown in FIG. 12, has banked guides 16 for a carriage 18, which can be displaced through a means having a crank 20 and a connecting rod 22 to orient the carriage 18 in a position above the platform or blade 9 and in a position above a tray V, the latter position being a reception position substantially side by side with regard to platform 9. The carriage 18 carries an assembly 18A that can be raised or lowered as shown in different illustrations A through F of FIG. 12, both with respect to platform 9 and tray V. The assembly 18A carries a number of suckers designed to pick up the tiles simultaneously (FIGS. 12A–C) stripped from a same mold, raise the tiles from platform 9 (FIG. 12C) transfer the tiles to the tray V FIGS. 12D–E and then lay the tiles upon the latter (FIG. 12F).

The single trays are shifted in a forward path f10 to receive the tiles and also, if necessary, to be stacked in a position 14A and are then picked up from track 14 and delivered to the seasoning tores or cells (not shown) through a path as shown by arrow f12.

Each single tray or the piles of trays are subsequently transferred from the seasoning cells or the like onto the truck 14 at the opposite end with respect to that from which they have been picked up. The trays may be separated in a position 14B and the single trays are shifted forward separately until they are below a pick up device 28. Before reaching said pick up device, a transverse sliding offset of the tiles, one stacked upon another on each tray, may be provided at a station 14C, to allow the detachment of one tile from another, before the pick up station.

Figure 13:
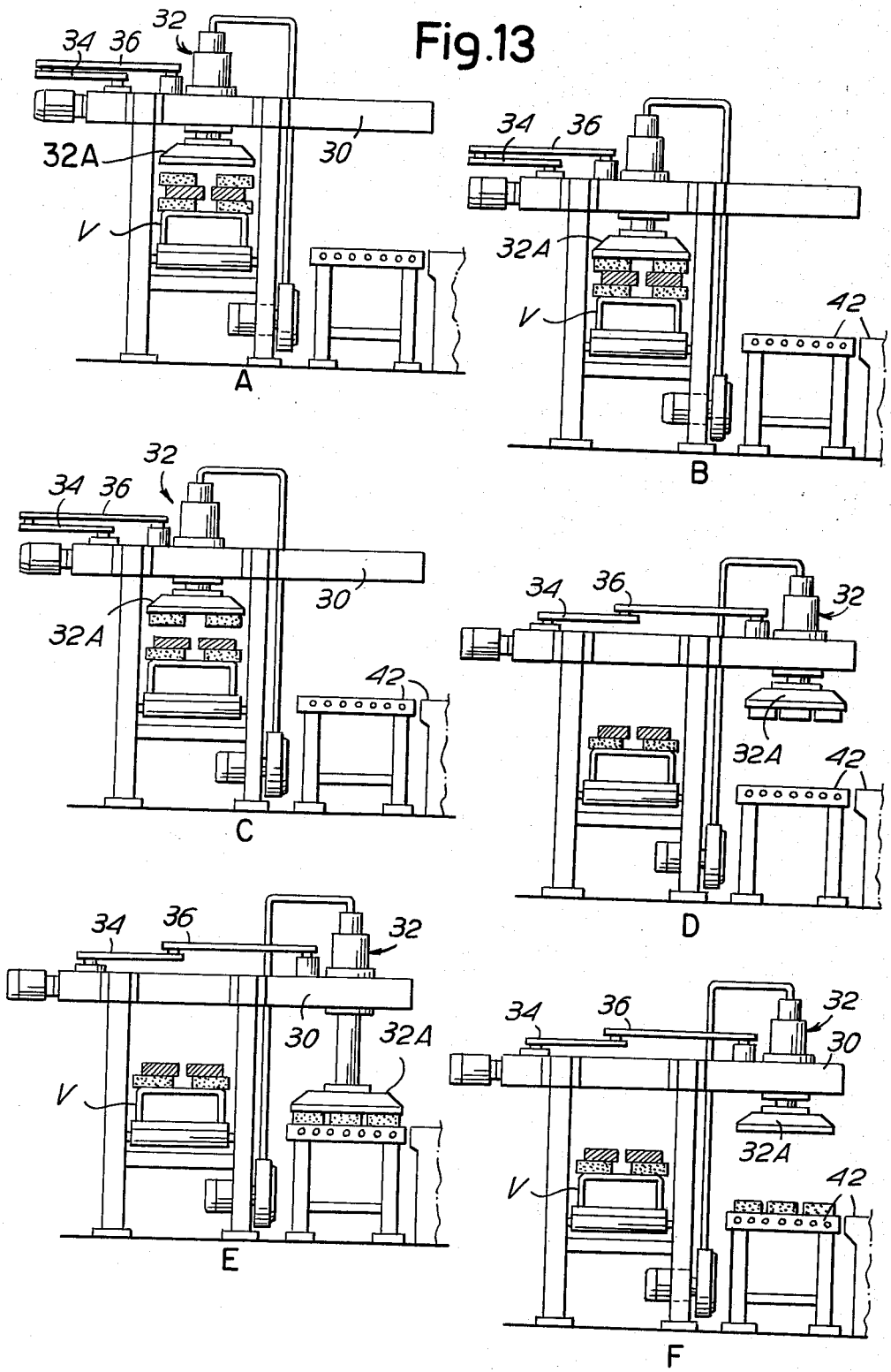

A device 28 (see FIG. 13A-F) is provided in the picking station. The device 28 has banked sliding tracks or guides 30, along which a carriage 32 can slide between two positions, controlled by a crank 34 and a connecting rod 36. Carriage 32 carries an assembly 32A which can be raised or lowered and which is also capable of rotating around a vertical axis. The rotation may be obtained during and by virtue of the translation of carriage 32, a rack 38 (see FIG. 7) is provided along guides 30 on which a sprocket wheel of a gearing 40 is engaged to give the assembly 32A a rotation of ninety degree. In some cases, the rotation is not required. The assembly 32A has a number of suckers that permit the picking of the tiles coming from the seasoning cells or station (FIGS. 13A-B, the raising of the tiles from the tray FIG. 13C, transferring the tiles to a transverse carrier 42 (FIG. 13D), then lowering and laying the tiles down upon said carrier FIG. 13E-F with the subsequent return of the assembly through the reverse path upon the tray.

As the carrier 42 must generally drive the tiles to a continuous smoothing machine, it is preferable that the front side of the tiles, advancing along a path according to arrow f16 upon carrier 42, be as narrow as possible. For this reason, when a plurality of tiles or tile piles, having adjacent sides of different dimensions are longitudinally disposed on the same tray V, on carrier 14, so that the greater side faces path f16 as shown in FIG. 8, it is then suitable that the tile arrangement be rotated ninety degrees as it can be seen in FIG. 9, so as to have the whole set of tiles with the narrowest front. Rotation is not necessary when the traverse front of the tiles disposed on the same tray and picked up from equipment 32 is greater than the tray longitudinal front in the direction of the feed of carrier 14.

From the tile picking station 28, the empty trays are delivered through a cleaning means 50 and subsequently conveyed through the device 12 in the tile receiving station.

According to the invention, the plant has been arranged so as to permit the best use of trays by considering that different power presses can be combined with the plant and that relatively high power presses can produce an output of tiles of different size and number for each mold. It has been considered that a same suitably sized tray can receive tiles distributed according to a single press output (since tiles of various subsequent castings can be piled up one upon another to form tile piles), and tiles distributed according to two or more tile castings as well. In the latter case, after accommodation of casting tiles (or a number of subsequent castings to form piles of tiles) in a zone of the tray, the tray itself is replaced to receive at least in another zone, an equivalent number of tiles (or tile piles), before being lead to the seasoning means through a possible stacking of more trays. Thus, it is possible to have an effective use of each tray and minimize the dead zones even in the cells or in the seasoning stove.

In other words, as an alternative, a tray or a row of trays respectively are designed to advance at any cycle for such a length equal to the tray length measured in direction of guides 14, or respectively advance, at any cycle, the tray or the row of trays for such a length equal to a submultiple of said tray length. To obtain this selective control, a set of switches or microswitches can be provided, for example, along the guide 14, which extend with the rolling cylinders.

Figure 11:
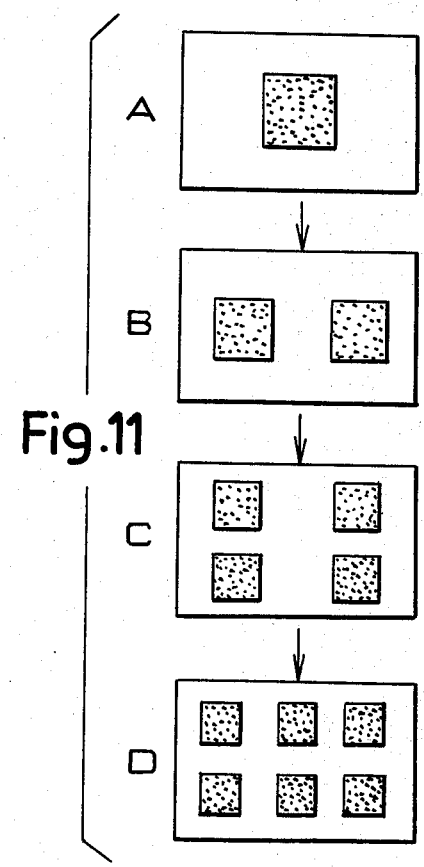

A switch 81, as shown in FIGS. 1 and 2, may be provided to cooperate with a front edge (or also with a rear edge) of a tray V50 to stop it at a symmetrical position below the transfer device 12 and with its center line aligned with that of platform 9, to receive tiles from a single casting or from a plurality of castings with the stacked tiles forming a pile. This can allow the loading of the trays with the arrangement shown, for example, in one of the conditions illustrated in FIG. 11, the tiles being distributed as they are stripped from the mold 3.

In FIGS. 4 and 6, instead, an arrangement is shown according to which, a tray is moved forward on track 14, each time for a displacement equal to half its length in the feed direction. This can be obtained by two switches 83 and 85 one disposed behind the other along track 14 at a distance equal to the feed unit required for. In this case, the displcement is equal to half the tray length. Thus a tray can come to a first position V52 in which, a tile M52 (or subsequently a pile of tiles) can be loaded on said tray, on the arrangement of the loading device 12 which is shown by the arrow f12 in the two diagrams of FIG. 6, this condition being that shown with X controlled by switch 83. Upon completion of the pile of tiles M52, the tray V52 is moved forward to reach position V54 (see arrangement Y of FIG. 6) controlled by switch 85 (see FIG. 5), such as to load on the same tray (which has reached the position V54 from that V52) a pile of tiles M54.

Figure 10:
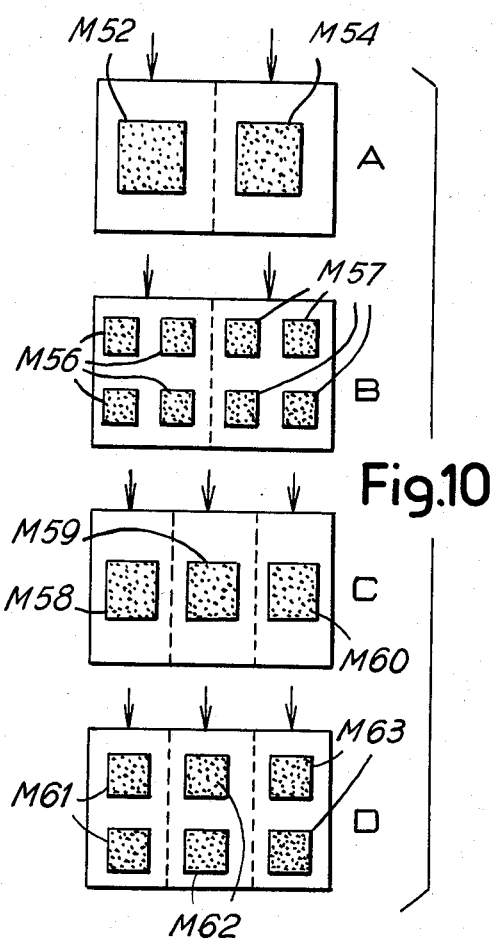
FIGS. 10 and 11 show various stripping possibilities from a plurality of subsequent molds, the tiles being laid down upon the same tray, or respectively the possibility for subsequent strippings from a plurality of molds upon a tray.

In FIG. 10A the tray with the pile of tiles M52 and M54 laid down upon the tray is shown the latter being moved forward for an extent equal to half the tray length; thus the tray maintained twice a position, that is two successive positions, below the assembly 12, before the tray below said assembly 12 is replaced.

Also in FIG. 10B a condition is shown in which a tray comes in two subsequent positions for receiving the tiles, in the first of which, four piles of tiles M56 are formed in the stripping arrangement from a quadruple mold, whereas in the second position of the tray the latter receives four piles of tiles M57. In FIGS. 10C and 10D conditions are shown for which each tray subsequently takes up three positions, in order to subsequently receive one pile of tiles M58, one pile of tiles M59 and one pile of tiles M60 (FIG. 10C) and a pair of piles of tiles M61, a pair of piles of tiles M62 and a pair of piles of tiles M63 (FIG. 10D). In this case, three switches 83 will be provided, like those 83 and 85 and one spaced from the other by one-third of the tray length. Other similar arrangements may be provided according to press power and desired output.

The feed of the trays and respectively of the piles of trays on track 14 may be operated together with that of the trays which are to receive the tiles. Alternatively for the upstream and downstream tray rows of the press loading region, either a continuous or a discontinuous feed may be provided, said discontinuous feed consisting of displacements equal to the length of the trays with the optional addition of a desired space between a tray and the other, by maintaining thus an independent control of the tray feed in the area in the vicinity of assembly 12. However, a switch may be provided, like that shown with 87, in order to control the tray feed below the transfer assembly 28.

The possibility to obtain a lowered displacement of the tray and therefore a tile arrangements upon the tray that is multiple of the stripping arrangement from a mold of the press, results in that the overall dimensions of the tiles upon a tray in the tray travelling direction on track 14 may be relatively considerable with respect to the transverse overall dimensions of the same tiles. For this reason it may be necessary to rotate the tiles, picked up from a tray, by the already described device which causes the plate of equipment 32A to rotate with respect to truck 32 during the tray row transfer to the carrier 42.

By the described arrangement we obtain an effective use of the trays and therefore, a lower number of trays with respect to the obtainable output.

FIG. 14 shows the four loading phases of a tray with the placement of four groups simultaneously molded tiles. First, a set of four simultaneously molded tiles M101 is laid down and so are subsequently stacked groups as to form four piles. Then, a group of simultaneously molded tiles M103 is transversally laid down side by side (with respect to tray feed direction according to arrow f10) with respect to rows M101; subsequently stacked groups form other four rows. Then a tray is moved forward of a step equal to half its size in the direction of arrow f10, and then four other rows of tiles M105 are laid down, and still four other rows of tiles M107 side by side with those M105 are subsequently laid down. Substantially, rows of tiles are loaded on the same tray in a number corresponding to that of four castings. The laying down of tiles in two transversally arranged positions, can be effected selectively through different strokes of the transfer truck like that denoted by 18 with sucker equipment 18A.

It is intended that the drawing only shows an example given just as a practical embodiment of the invention, said invention varying in forms and arrangements without however departing from the scope of the concept which informs the invention itself.

I claim:

1. An improved apparatus, for handling articles of manufacture, such as cement tiles or the like and transporting the articles sequentially through a plurality of operating stations, comprising: a first conveying means, a charging station disposed adjacent said first conveying means, a plurality of trays adapted to be disposed on said first conveying means whereby said first conveyor means serially advances through trays through a first conveying path toward said charging station, said charging station including means overlying said first conveying path for stacking said articles onto the trays in said charging station, a tray station disposed downstream of said charging station, said tray piling station having means for stacking a plurality of trays containing said stacked articles one upon the other as the respective trays pass through said charging station, a second conveyor means having an end portion adapted to receive a plurality of stacked trays containing subsequently processed articles, a tray unpiling station associated with said second conveyor means, an article pick-up station disposed downstream from said unpiling station whereby the processed articles are removed from said unpiled trays, said tray unpiling station including means for sequentially removing said trays from said stacked trays whereby said unstacked trays are sequentially advanced toward said pick-up station to effect the removal of the articles from said trays, and said emptied trays being recycled to said first conveyor means on an interconnecting conveyor for advancement toward said charging station, and means for selectively moving said trays into said charging station through steps equal to submultiples of the tray length for sequentially receiving two or more stackings of said articles from said charging station.

2. The improved apparatus as set forth in claim 1, in which said selective moving means comprises at least two or more switch means located along said first conveying path below said stacking means at a spaced distance equaling a submultiple of the tray length, and wherein said switch means are operable to cyclically stop movement of said trays in steps equal to one of the tray length and submultiple thereof.

3. The improved apparatus as set forth in claim 2, wherein said stacking means is operable to stack said articles in at least two transversely adjacent positions relative to the feed direction of said first conveying path.

4. The improved apparatus as set forth in claim 2, wherein said charging means includes lifting means for raising and lowering said articles and said lifting means being operable to rotate about a vertical axis.

5. The improved apparatus as set forth in claim 4, wherein said lifting means is operable to rotate orthogonally relative to the feed direction of said first conveying path.

6. The improved apparatus as set forth in claim 1, wherein said stacking means is operable to stack said articles in at least two transversely adjacent positions relative to the feed direction of said first conveying path.

7. The improved apparatus as set forth in claim 1, wherein said charging means includes lifting means for raising and lowering said articles and said lifting means being operable to rotate about a vertical axis.

8. The improved apparatus as set forth in claim 7, wherein said lifting means is operable to rotate orthogonally relative to the feed direction of said first conveying path.

* * * * *